Robert B. Hodge,
INVENTOR.
BY.

Paul M. Cole

ATTORNEY.

United States Patent Office 3,397,819
Patented Aug. 20, 1968

3,397,819
GAS REPLENISHMENT DEVICE
Robert B. Hodge, Malibu, Calif., assignor to Hughes Aircraft Company, Culver City, Calif., a corporation of Delaware
Filed July 19, 1967, Ser. No. 654,626
13 Claims. (Cl. 222—3)

ABSTRACT OF THE DISCLOSURE

In the disclosed device for supplying replenishing gas to a gas laser, a plurality of glass capsules containing the laser gas at a pressure substantially greater than the laser gas pressure are disposed in a housing of ductile material which is hermetically sealed to the laser in gas communicating relationship. Rupture of a capsule by the application of force to the housing at a region adjacent the capsule releases the pressurized gas into the laser.

---

This invention relates to gas replenishment; more particularly, it relates to a device for simply and readily replenishing gas to a utilization device such as a gas laser.

Over the past few years the gas laser has found ever-increasing importance and use, both in industry and in research. However, on account of gas absorption in the walls of a gas laser during operation, the amount of laser gas gradually decreases as a function of laser operation time. Eventually, the gas pressure drops below a level at which satisfactory laser operation can be achieved, thereby limiting the useful life of a gas laser, typically, to the order of 50 hours or so. In the prior art, when the gas pressure had fallen below this critical level, the gas-containing chamber would have to be discarded and replaced with a new one, thereby consuming considerable time and greatly adding to the expense of operating the laser. Thus, a simple, economical and expedient way to supply replenishing gas to a gas laser would be of great value to the industry.

Accordingly, it is an object of the present invention to provide a simple, practical and inexpensive arrangement for replenishing gas to a gas utilization device such as a gas laser.

It is a further object of the present invention to provide a light and compact gas replenishment source for a gas laser which is readily integratable with the laser during its manufacture.

In accordance with the foregoing objects, a gas replenishing device according to the present invention includes a housing of ductile material which is hermetically sealed to the utilization device whose gas is to be replenished in gas communicating relationship therewith. At least one readily breakable capsule, containing a quantity of the same gas as that used in the utilization device and at a pressure substantially greater than the gas pressure in the utilization device, is disposed in the housing. The application of force to the housing at a region adjacent the capsule ruptures the capsule, thereby releasing the gas contained therein and allowing it to travel into the utilization device.

Other objects, advantages and characteristic features of the present invention will become more fully apparent from the following detailed description of a preferred embodiment of the invention when considered in conjunction with the accompanying drawing in which.

Figure 1:
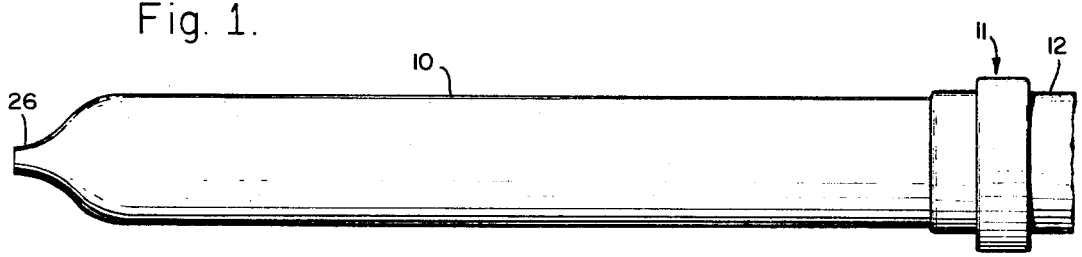
FIG. 1 is a longitudinal view illustrating a gas replenishing device in accordance with the invention.
Figure 2:
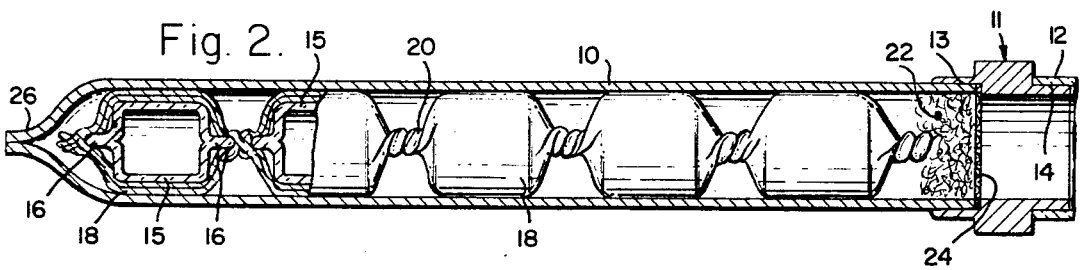
FIG. 2 is a longitudinal view, primarily in section, showing the device of FIG. 1.

Referring to FIGS. 1 and 2 with greater particularity, a gas replenishment device in accordance with the invention may be seen to include an elongated tubular housing 10 of a ductile material such as annealed copper. One end of the housing 10 is hermetically sealed by means of an adapter ring 11 to a gas utilization device 12 which in a preferred embodiment of the invention is a gas laser. As is illustrated in FIG. 2, the interior of the housing 10 is in gas communicating relationship with the gas-containing laser chamber 12. The adapter ring 11 should be of a material having a thermal coefficient of expansion similar to that of the wall material for the chamber 12. For example, for a laser chamber wall of glass, the adapter ring 11 may be of "Kovar." Adapter ring 11 is hermetically sealed to the housing 10 and to the laser chamber 12 along surfaces 13 and 14, respectively.

Disposed within the housing 10 are a plurality of capsules 15 of a readily breakable material such as soft "Pyrex" glass. Each capsule 15 extends substantially throughout the cross-section of the housing 10 at a different longitudinal location along the housing 10. Although five such capsules are illustrated in the drawing, it is pointed out that this number of capsules is shown solely for illustrative purposes, and any practical number of capsules may be employed as necessity demands. The capsules 15 are filled with the same gas as that used in the laser 12 but at a gas pressure substantially greater than the gas pressure in the laser. For example, the laser gas pressure may be around .043 mm. Hg, while the capsule gas pressure may be 10.0 mm. Hg. Exemplary gases which may be used are argon, krypton, and a helium-neon mixture, although it should be understood that the capsules 15 can be filled with any gas capable of being used in a gas laser.

A preferred manner of manufacturing the capsules 15 involves initially filling a tube-like arrangement consisting of a plurality of interconnected glass capsules with the desired gas to the desired pressure, so that a uniform gas pressure may be obtained. Then the individual capsules are separated and sealed off, leaving only nipples 16 as evidence of their prior attachment.

As will be more fully explained below, rupture of the capsules 15 enables the pressurized gas contained therein to escape and travel into the laser chamber 12. However, care must be taken to prevent fragments of broken glass produced during breakage of the capsules 15 from entering the laser chamber 12. For this purpose one or more of several alternative schemes may be employed. For example, the capsules 15 may be wrapped in one or more layers of an aluminum foil 18, or similar material, and which foil is twisted, as shown at 20, between individual capsules to give a sausage-like overall appearance. Alternatively, or in addition to the foil wrapping, a mass 22 of a material such as glass wool may be disposed across the interior of the housing 10 at its end adjacent the laser 12. Alternatively, or in addition to the foil wrapping and/or glass wool, a fine mesh screen 24 may be mounted across the end of the housing 10 adjacent the laser 12.

During manufacture of a gas replenishing arrangement in accordance with the invention, after the housing 10 has been hermetically sealed to the laser chamber 12 and the capsules 15 have been inserted into the housing 10, the laser is filled with the desired gas at the desired pressure. On account of the gas communication between the laser chamber 12 and the interior of the housing 10, the laser gas also enters the housing 10 and fills the space between the individual capsules 15. The end of the housing 10 remote from the laser 12 is then hermitaclly sealed, as shown at 26.

Figure 3:
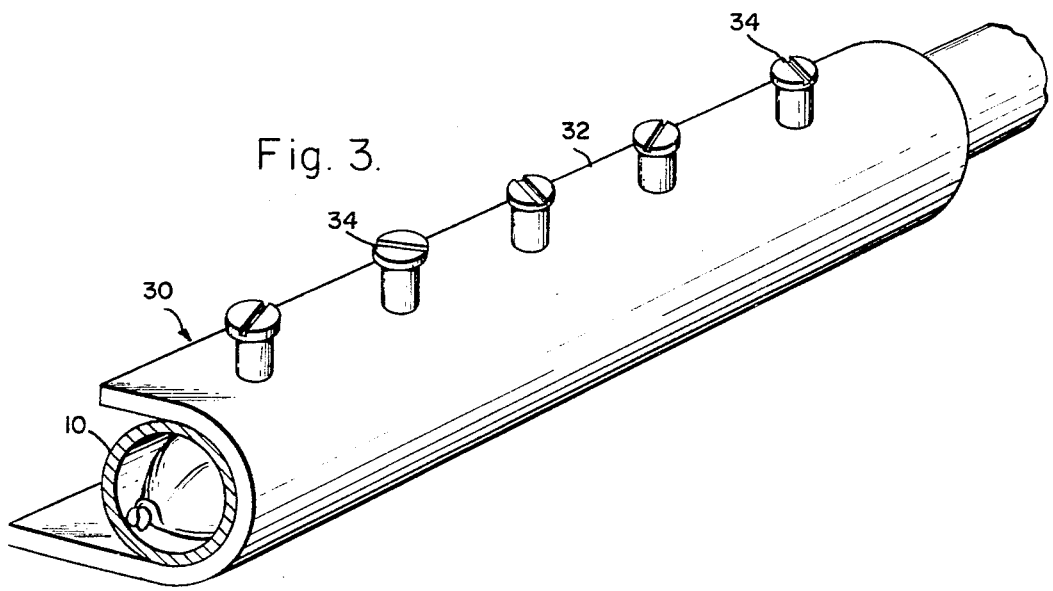
FIG. 3 is a perspective view illustrating the device of FIG. 1 as mounted in a force applying assembly.

A gas replenishment device as inserted within an exemplary force applying arrangement for rupturing the gas-containing capsules 15 is illustrated in FIG. 3. The force applying arrangement, which is designated generally by the numeral 30, includes an elongated support member 32 having a substantially U-shaped cross-section which is disposed about the housing 10 in close-fitting relationship. A plurality of force applying elements 34, as shown as screws for purpose of illustration, are mounted in the support member 34 at various locations therealong in alignment with respective ones of the capsules 15.

In the operation of the gas replenishing device of the invention, when the gas pressure within the laser chamber 12 has fallen below the desired level, one of the elements 34 is moved inwardly to depress the adjacent wall of the housing 10 and rupture the adjacent glass capsule 15. Pressurized gas contained in the broken capsule 15 then travels through the housing 10 and into the laser chamber 12 to raise the gas pressure within the laser chamber and thereby extend the effective life of the laser, for example by around 50 hours or more. Additional capsules 15 may be broken in the same manner as the need arises for further increased gas in the laser 12. The particular order of breakage of the various capsules 15 is immaterial, as sufficient space exists between the foil wrapping 18 and the housing 10 to permit gas movement therebetween.

Although the present invention has been shown and described with reference to a particular embodiment, nevertheless, various changes and modifications obvious to one skilled in the art to which the invention pertains are deemed to lie within the spirit, scope and contemplation of the invention.

What is claimed is:

1. A device for supplying replenishing gas to a gas utilization device comprising:
    a housing of ductile material hermetically sealed to said gas utilization device in gas communicating relationship therewith;
    at least one capsule of readily breakable material disposed in said housing, said capsule containing a quantity of the same gas as that used in the gas utilization device and at a pressure substantially greater than the gas pressure in the gas utilization device; and
    means for applying force to said housing at a region adjacent said capsule and of sufficient magnitude to rupture said capsule, whereby the gas contained therein is released and introduced into said gas utilization device.

2. A device for supplying replenishing gas to a gas utilization device comprising:
    a housing of ductile material hermetically sealed to said gas utilization devce in gas communicating relationshp therewith;
    at least one capsule of readily breakable material disposed in said housing, said capsule containing a quantity of the same gas as that used in the gas utilization device and at a pressure substantially greater than the gas pressure in the gas utilization device;
    means for applying force to said housing at a region adjacent said capsule and of sufficient magnitude to rupture said capsule, whereby the gas contained therein is released and introduced into said gas utilization device; and
    means disposed in said housing for preventing fragments of said capsule produced during rupture thereof from entering said gas utilization device.

3. A device according to claim 2 wherein the last-named means comprises a foil wrapping surrounding said capsule.

4. A device according to claim 2 wherein the last-named means comprises a mass of glass wool extending across the interior of said housing between said capsule and said gas utilization device.

5. A device according to claim 2 wherein the last-named means comprises a fine mesh screen mounted across said housing adjacent said gas utilization device.

6. A device for replenishing gas to a gas utilization device comprising:
    an elongated housing of ductile material having one end hermetically sealed to said gas utilization device in gas communicating relationship therewith;
    a plurality of capsules of readily breakable material sequentially disposed in said housing, each capsule extending substantially throughout the cross-section of said housing and containing a quantity of the same gas as that used in the gas utilization device and at a pressure substantially greater than the gas pressure in the gas utilization device; and
    means for selectively applying force to said housing at respective regions adjacent the respective capsules and of sufficient magnitude to rupture the selected capsule, whereby the gas contained therein is released and introduced into said gas utilization device.

7. A device according to claim 6 wherein the force applying means comprises an elongated support member of a substantially U-shaped cross-section disposed about said housing, and a plurality of force applying elements transversely movably mounted in said support member at locations therealong in alignment with respective ones of said capsules.

8. In combination with a gas laser including a chamber containing a preselected gas at a predetermined pressure, an arrangement for replenishing said gas, said arrangement comprising:
    a housing of ductile material hermetically sealed to said chamber in gas communicating relationship therewith; and
    at least one capsule of readily breakable material disposed in said housing, said capsule containing a quantity of said preselected gas at a pressure substantially greater than said predetermined pressure.

9. In combination with a gas laser including a chamber containing a preselected gas at a predetermined pressure, an arrangement for replenishing said gas, said arrangement comprising:
    a housing of ductile material hermetically sealed to said chamber in gas communicating relationship therewith;
    at least one capsule of readily breakable material disposed in said housing, said capsule containing a quantity of said preselected gas at a pressure substantially greater than said predetermined pressure; and
    means for applying force to said housing at a region adjacent said capsule and of sufficient magnitude to rupture said capsule, whereby the gas contained therein is released and introduced into said chamber.

10. In combination with a gas laser including a chamber containing a preselected gas at a predetermined pressure, an arrangement for replenishing said gas, said arrangement, comprising:
    a housing of ductile material hermetically sealed to said chamber in gas communicating relationship therewith;
    at least one capsule of readily breakable material disposed in said housing, said capsule containing a quantity of said preselected gas at a pressure substantially greater than said predetermined pressure; and
    means disposed in said housing for substantially preventing solid material in said housing from entering said chamber.

11. In combination with a gas laser including a chamber containing a preselected gas at a predetermined pressure, an arrangement for replenishing said gas, said arrangement comprising:
    a housing of ductile material hermetically sealed to said chamber in gas communicating relationship therewith;
    at least one capsule of readily breakable material disposed in said housing, said capsule containing a quantity of said preselected gas at a pressure substantially greater than said predetermined pressure;
    means for applying force to said housing at a region adjacent said capsule and of sufficient magnitude to rupture said capsule, whereby the gas contained therein is released and introduced into said chamber; and means disposed in said housing for preventing fragments of said capsule produced during rupture thereof from entering said chamber.

12. In combination with a gas laser including a chamber containing a preselected gas at a predetermined pressure, an arrangement for replenishing said gas, said arrangement comprising:

an elongated housing of ductile material having one end hermetically sealed to said chamber in gas communicating relationship therewith;

a plurality of capsules of readily breakable material sequentially disposed in said housing, each capsule extending substantially throughout the cross-section of said housing and containing a quantity of said preselected gas at a pressure substantially greater than said predetermined pressure; and means disposed in said housing for substantially preventing solid material in said housing from entering said chamber.

13. In combination with a gas laser including a chamber containing a preselected gas at a predetermined pressure, an arrangement for replenishing said gas, said arrangement comprising:

an elongated housing of ductile material having one end hermetically sealed to said chamber in gas communicating relationship therewith;

a plurality of capsules of readily breakable material sequentially disposed in said housing, each capsule extending substantially throughout the cross-section of said housing and containing a quantity of said preselected gas at a pressure substantially greater than said predetermined pressure;

means for selectively applying force to said housing at respective regions adjacent the respective capsules and of sufficient magnitude to rupture the selected capsule, whereby the gas contained therein is released and introduced into said chamber; and means disposed in said housing for preventing fragments of said capsules produced during rupture thereof from entering said chamber.

References Cited

UNITED STATES PATENTS

| | | | |
|---|---|---|---|
| 2,103,194 | 12/1937 | Thorsen | 222—94 |
| 2,587,191 | 2/1952 | Merullo | 222—103 |
| 2,681,053 | 6/1954 | Moody | 222—83.5 X |
| 3,123,253 | 3/1964 | Lambton | 222—82 |
| 3,135,090 | 6/1964 | Straight et al. | 222—82 |
| 3,189,227 | 6/1965 | Hobbs et al. | 222—94 |
| 3,268,184 | 8/1966 | Biggar et al. | 222—107 X |

SAMUEL F. COLEMAN, *Primary Examiner.*